US009835072B2

(12) United States Patent
Seo (10) Patent No.: US 9,835,072 B2
(45) Date of Patent: Dec. 5, 2017

(54) RECOVERED ENERGY TRANSFER APPARATUS OF WASTE HEAT RECOVERY SYSTEM

(71) Applicant: HYUNDAI MOTOR COMPANY, Seoul (KR)

(72) Inventor: Jung Min Seo, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/218,751

(22) Filed: Jul. 25, 2016

(65) Prior Publication Data

US 2017/0058745 A1 Mar. 2, 2017

(30) Foreign Application Priority Data

Aug. 24, 2015 (KR) .................. 10-2015-0119065

(51) Int. Cl.
*F01N 5/02* (2006.01)

(52) U.S. Cl.
CPC ............... *F01N 5/02* (2013.01); *Y02T 10/16* (2013.01)

(58) Field of Classification Search
CPC ............ F01N 5/02; F01N 5/025; Y02T 10/16
USPC ...................................................... 180/165
See application file for complete search history.

(56) References Cited

U.S. PATENT DOCUMENTS

| | | | |
|---|---|---|---|
| 4,570,077 A | 2/1986 | Lambley | |
| 5,327,987 A * | 7/1994 | Abdelmalek | B60K 6/48 180/65.25 |
| 6,725,662 B2 * | 4/2004 | Baba | F01K 23/065 60/620 |
| 8,739,531 B2 | 6/2014 | Teng et al. | |
| 8,924,093 B2 * | 12/2014 | Husson | B60K 25/02 701/50 |
| 2008/0110171 A1 | 5/2008 | Schmeltz | |
| 2012/0304643 A1 | 12/2012 | Mori et al. | |
| 2013/0000291 A1 | 1/2013 | Nelson et al. | |
| 2013/0056992 A1 * | 3/2013 | Wada | F01K 23/065 290/1 A |
| 2014/0352301 A1 | 12/2014 | Mueller | |

FOREIGN PATENT DOCUMENTS

| | | |
|---|---|---|
| JP | 2008-121674 A | 5/2008 |
| KR | 10-2012-0064468 A | 6/2012 |
| KR | 10-2013-0036162 A | 4/2013 |

* cited by examiner

*Primary Examiner* — John D Walters
(74) *Attorney, Agent, or Firm* — McDermott Will & Emery LLP (57) ABSTRACT

A recovered energy transfer apparatus of a waste heat recovery system includes an input unit connected to an expander of the waste heat recovery system and rotatable by recovered energy of the expander, and one or more output units for receiving a torque of the input unit and outputting the torque to at least one of a power generator, an engine of a vehicle, and a power take-off (PTO) for a vehicle.

20 Claims, 5 Drawing Sheets

RECOVERED ENERGY TRANSFER APPARATUS OF WASTE HEAT RECOVERY SYSTEM

CROSS-REFERENCE TO RELATED APPLICATION

This application claims the benefit of priority to Korean Patent Application No. 10-2015-0119065, filed on Aug. 24, 2015 with the Korean Intellectual Property Office, the disclosure of which is incorporated herein in its entirety by reference.

TECHNICAL FIELD

The present disclosure relates to a recovered energy transfer apparatus of a waste heat recovery system, and more particularly, to a recovered energy transfer apparatus of a waste heat recovery system capable of significantly improving fuel efficiency by reducing waste of recovered energy.

BACKGROUND

An internal combustion engine has been widely used in vehicles, ship, small power generators, and the like, and attempts to improve efficiency of the internal combustion engine have been continuously conducted. In the internal combustion engine, a large quantity of heat is generally exhausted as waste heat, and a waste heat recovery system for increasing efficiency of the internal combustion engine by recovering the waste heat as energy has been developed.

The waste heat recovery system is configured to recover waste heat exhausted from an engine as energy, convert the recovered energy into electric energy or mechanical energy, and utilize the electric energy or the mechanical energy in the engine, other electrical accessories, or the like, of the vehicle.

The waste heat recovery system is configured to include a Rankine cycle to effectively recover the waste heat of the engine. The Rankine cycle includes a circulation path through which an operating medium is circulated, and the circulation path of the Rankine cycle is provided with a boiler (evaporator) for heating and evaporating the operating medium by the waste heat (heat of an exhaust gas and/or heat of an exhaust gas recirculation (EGR) gas) of the engine, an expander for expanding the operating medium supplied from the boiler to generate rotation power, a condenser for condensing the operating medium exhausted from the expander, and a pump for circulating the operating medium on the circulation path.

A scheme of transferring the recovered energy of the waste heat recovery system described above as auxiliary power to the engine or utilizing the recovered energy to store electric energy of a power generator has been used. However, in the case of such a scheme, a utilization strategy of the recovered energy is not efficient.

SUMMARY

The present disclosure has been made to solve the above-mentioned problems occurring in the prior art while advantages achieved by the prior art are maintained intact.

An aspect of the present disclosure provides a recovered energy transfer apparatus of a waste heat recovery system capable of significantly improving fuel efficiency by transferring recovered energy to an engine of a vehicle or a power take-off (PTO) for a vehicle in a condition in which auxiliary power is required in the vehicle and transferring recovered energy obtained through the waste heat recovery system to an alternator without loss in a condition (braking, stopping, parking, and the like, of the vehicle) in which the auxiliary power may not be transferred to a vehicle side to reduce waste of the recovered energy.

According to an exemplary embodiment of the present disclosure, a recovered energy transfer apparatus of a waste heat recovery system may include: an input unit connected to an expander of the waste heat recovery system and rotatable by recovered energy of the expander; and one or more output units for receiving a torque of the input unit and outputting the torque to at least one of a power generator, an engine of a vehicle, and a power take-off (PTO) for a vehicle.

The input unit may have a shaft and an input gear provided on an outer peripheral surface of the shaft, and an output shaft of the expander may be coupled to the shaft.

The output units may include a first output unit connected to the power generator and a second output unit connected to the engine of the vehicle or the PTO for a vehicle.

The first output unit may have a shaft and a first output gear provided on an outer peripheral surface of the shaft, and an output shaft of the power generator may be coupled to the shaft.

The second output unit may have a shaft and a second output gear provided on an outer peripheral surface of the shaft, and any one of the engine of the vehicle and the PTO for a vehicle may be connected to the shaft.

The recovered energy transfer apparatus of a waste heat recovery system may further include one or more transfer units interposed between the input unit and the output units and transferring the torque of the input unit to the output units.

The transfer units may include a first transfer unit disposed between the input unit and the first output unit and transferring the torque of the input unit to the first output unit and a second transfer unit disposed between the input unit and the second output unit and transferring the torque of the input unit to the second output unit.

The first transfer unit may have a shaft, an input-side gear provided at one side of the shaft, and an output-side gear provided at the other side of the shaft, and the input-side gear may be engaged with the input gear of the input unit, and the output-side gear may be engaged with the first output gear of the first output unit.

The second transfer unit may have a shaft, an input-side gear provided at one side of the shaft, and an output-side gear provided at the other side of the shaft.

The input-side gear of the second transfer unit may be engaged with the input gear of the input unit, and the output-side gear of the second transfer unit may be engaged with the second output gear of the second output unit.

A clutch may be installed at the shaft of the second output unit, the clutch connecting or blocking a transfer of the torque of the input unit through the second output unit.

A pulley may be installed at the shaft of the second output unit, the pulley being connected to a crank shaft of the engine through a belt.

A shaft of the PTO for a vehicle may be connected to the shaft of the second output unit.

According to another exemplary embodiment of the present disclosure, a recovered energy transfer apparatus of a waste heat recovery system may include: an input unit connected to an expander of the waste heat recovery system and rotatable by recovered energy of the expander; a first output unit connected to a power generator; a second output unit connected to a hydraulic circuit; a first transfer unit for transferring a torque of the input unit to the first output unit; and a second transfer unit for transferring the torque of the input unit to the second output unit, wherein the hydraulic circuit includes a hydraulic pump connected to the second output unit and a hydraulic motor connected to an engine of a vehicle or a PTO for a vehicle.

A pressure relief valve allowing the hydraulic motor to be selectively in a no-load state may be connected.

According to still another exemplary embodiment of the present disclosure, a recovered energy transfer method of a waste heat recovery system using a recovered energy transfer apparatus of a waste heat recovery system including an input unit connected to an expander of the waste heat recovery system and rotated by recovered energy of the expander, a first output unit connected to a power generator, a second output unit connected to an engine of a vehicle or a PTO for a vehicle, a first transfer unit transferring a torque of the input unit to the first output unit, and a second transfer unit transferring the torque of the input unit to the second output unit may include: obtaining information on the vehicle; and transferring the recovered energy of the expander to at least one of the first output unit and the second output unit when it is decided that auxiliary power is required on the basis of the information on the vehicle.

The recovered energy transfer method of a waste heat recovery system may further include: deciding whether or not an output of the expander is larger than consumed power of the vehicle when it is decided that the auxiliary power is required; deciding whether or not a state of charge of a battery is larger than a first set value when the output of the expander is larger than the consumed power of the vehicle; and transferring the recovered energy of the expander to both of the first output unit and the second output unit when the state of charge of the battery is larger than the first set value.

The recovered energy transfer method of a waste heat recovery system may further include: deciding whether or not an output of the expander is larger than consumed power of the vehicle when it is decided that the auxiliary power is required; deciding whether or not a state of charge of a battery is larger than a first set value when the output of the expander is larger than the consumed power of the vehicle; and transferring the recovered energy of the expander to only the first output unit when the state of charge of the battery is smaller than the first set value and is larger than a second set value.

The recovered energy transfer method of a waste heat recovery system may further include: deciding whether or not an output of the expander is larger than consumed power of the vehicle when it is decided that the auxiliary power is required; deciding whether or not a state of charge of a battery is larger than a first set value when the output of the expander is larger than the consumed power of the vehicle; and transferring the recovered energy of the expander to only the second output unit when the state of charge of the battery is smaller than the first set value and a second set value.

The recovered energy transfer method of a waste heat recovery system may further include: deciding whether or not an output of the expander is larger than consumed power of the vehicle when it is decided that the auxiliary power is required; and transferring the recovered energy of the expander to only the second output unit when the output of the expander is smaller than the consumed power of the vehicle.

The recovered energy transfer method of a waste heat recovery system may further include transferring the recovered energy of the expander to only the first output unit when it is decided that the auxiliary power is not required.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. For reference, sizes of components, thicknesses of lines, and the like, shown in the accompanying drawings referred to in describing the present disclosure may be exaggerated to aid understanding. In addition, since terms used in a description of the present disclosure are defined in consideration of functions of the present disclosure, they may be changed depending on users, the intension of operators, customs, and the like. Therefore, these terms should be defined based on entire contents of the present disclosure.

Figure 1:
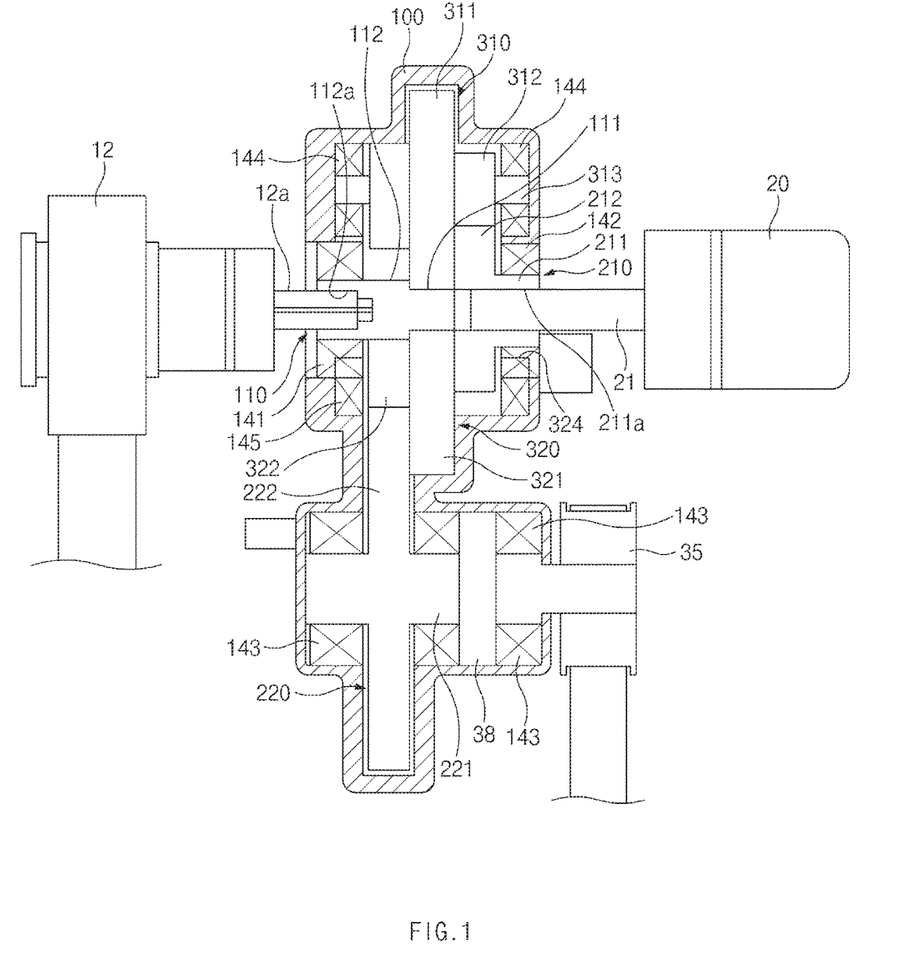
FIG. 1 is a view illustrating a recovered energy transfer apparatus of a waste heat recovery system according to an exemplary embodiment of the present disclosure.
Figure 2:
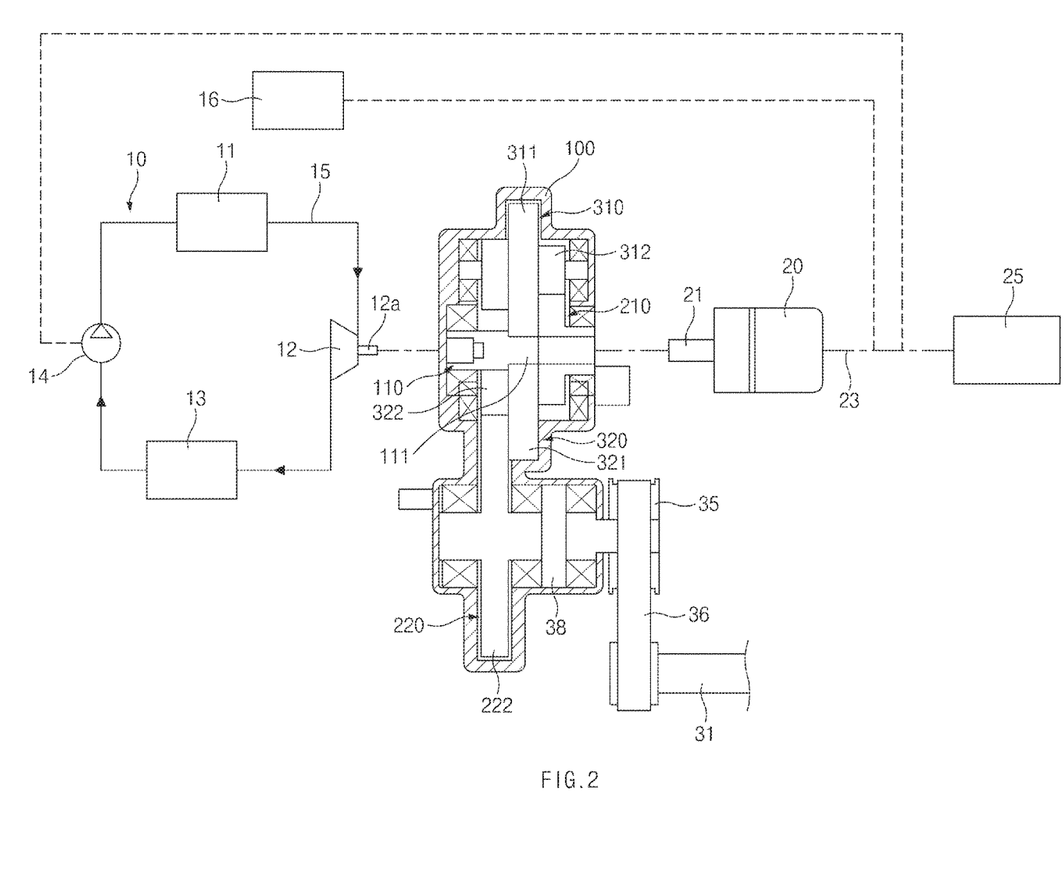
FIG. 2 is a view illustrating a state in which a recovered energy transfer apparatus of a waste heat recovery system according to an exemplary embodiment of the present disclosure is used between the waste heat recovery system and accessories.

FIGS. 1 and 2 are views illustrating a recovered energy transfer apparatus of a waste heat recovery system according to an exemplary embodiment of the present disclosure.

Referring to FIG. 2, a waste heat recovery system 10 may include a Rankine cycle for recovering waste heat exhausted from an engine to generate recovered power.

The Rankine cycle may include an evaporator (boiler) 11, an expander 12, a condenser 13, and a pump 14 installed on a circulation path 15 through which an operating medium is circulated. The evaporator 11 may heat and evaporate the operating medium by waste heat (heat of an exhaust gas and/or heat of an exhaust gas recirculation (EGR) gas) of the engine to generate an evaporated operating medium, the expander 12 may expand the operating medium supplied from the evaporator 11 to generate recovered energy, the condenser 13 may condense the operating medium exhausted from the expander 12 to generate a liquid-phase operating medium, and the pump 14 may supply the operating medium from the condenser 13 to the evaporator 11.

Referring to FIGS. 1 and 2, the recovered energy transfer apparatus of a waste heat recovery system according to an exemplary embodiment of the present disclosure may include an input unit 110 to which the expander 12 of the waste heat recovery system is connected, one or more output units 210 and 220, and one or more transfer units 310 and 320.

The input unit 110 may have a shaft 112 and an input gear 111 provided on an outer peripheral surface of the shaft 112. The shaft 112 may have a coupling hole 112a formed in one end surface thereof, and an output shaft 12a of the expander 12 may be coupled to the coupling hole 112a of the shaft 112.

The shaft 112 of the input unit 110 may be rotatably supported by a bearing 141 in a casing 100.

The output units 210 and 220 may include a first output unit 210 connected to a power generator 20 and a second output unit 220 connected to an engine of a vehicle or a power take-off (PTO) for a vehicle.

The first output unit 210 may have a shaft 211 and a first output gear 212 provided on an outer peripheral surface of the shaft 211. The shaft 211 may have a coupling hole 211a formed in one end surface thereof, and an output shaft 21 of the power generator 20 may be coupled to the coupling hole 211a of the first output unit 210.

The shaft 211 of the first output unit 210 may be rotatably supported by a bearing 142 in the casing 100.

The second output unit 220 may have a shaft 221 and a second output gear 222 provided on an outer peripheral surface of the shaft 221.

The shaft 221 of the second output unit 220 may be rotatably supported by a bearing 143 in the casing 100.

According to an exemplary embodiment, as illustrated in FIGS. 1 and 2, a pulley 35 may be installed at one end of the shaft 221 of the second output unit 220. The pulley 35 may be connected to a crank shaft 31 of the engine through a belt. Therefore, a torque of the second output unit 220 may be transferred to the crank shaft 31 of the engine.

According to an alternative exemplary embodiment, a shaft (not illustrated) for the PTO for a vehicle such as an engine PTO, a transmission PTO, or the like, may be connected to the shaft 211 of the second output unit 220. Therefore, the torque of the second output unit 220 may be transferred to the PTO for a vehicle.

Meanwhile, a clutch 38 may be installed at the shaft 221 of the second output unit 220. The clutch 38 may connect or block a transfer of a torque of the input unit 110 through the second output unit 220. For example, in a case (a cruise control of the vehicle or a power take-off operation) in which auxiliary power is required in the engine of the vehicle, the PTO, or the like, the clutch 28 may be engaged, such that the recovered energy of the expander 12 may be transferred to the engine of the vehicle or the PTO through the second output unit 220, and in a case (braking, stopping, parking, and/or the like, of the vehicle) in which the auxiliary power may not be transferred to the engine of the vehicle, the PTO, or the like, the clutch 38 may be disengaged, such that a transfer of the recovered energy of the expander 12 to the engine of the vehicle or the PTO through the second output unit 220 may be blocked and the entire recovered energy of the expander 12 may be transferred to the power generator 20 through the first output unit 210. Therefore, waste of the recovered energy is reduced, thereby making it possible to significantly improve fuel efficiency of the vehicle.

The transfer units 310 and 320 may include a first transfer unit 310 disposed between the input unit 110 and the first output unit 210 for transferring the torque of the input unit 110 to the first output unit 210 and a second transfer unit 320 disposed between the input unit 110 and the second output unit 220 for transferring the torque of the input unit 110 to the second output unit 220.

The first transfer unit 310 may have a shaft 313, an input-side gear 311 provided at one side of the shaft 313, and an output-side gear 312 provided at the other side of the shaft 313.

The shaft 313 of the first transfer unit 310 may be rotatably supported by a bearing 144 in the casing 100.

Figure 3:
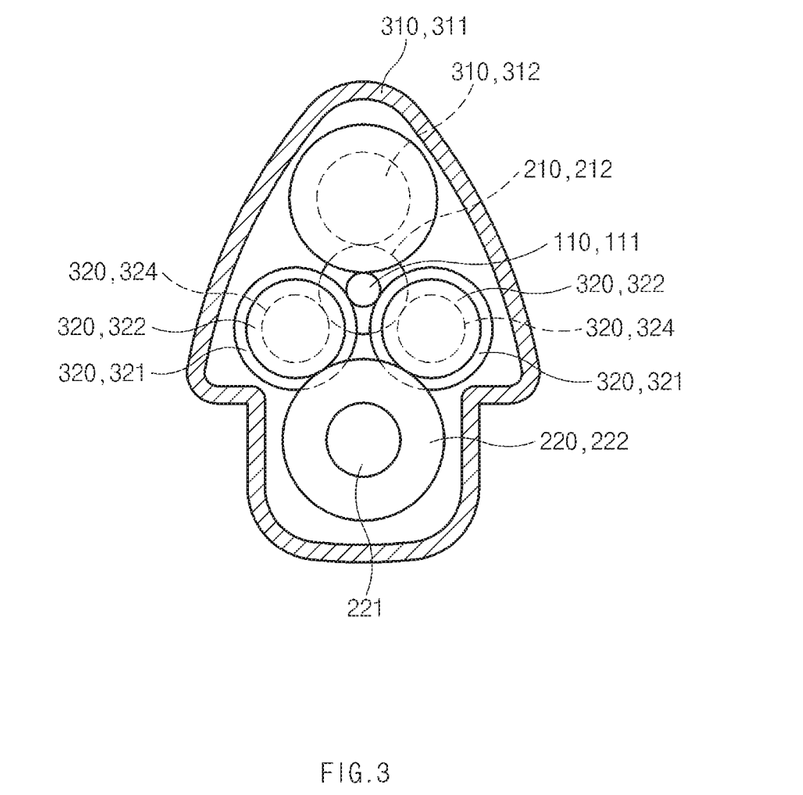
FIG. 3 is a cross-sectional view taken along line A-A of FIG. 1.

As illustrated in FIGS. 1 and 3, the input-side gear 311 of the first transfer unit 310 may be engaged with the input gear 111 of the input unit 110, and the output-side gear 312 of the first transfer unit 310 may be engaged with the first output gear 212 of the first output unit 210. Therefore, the torque of the input unit 110 may be transferred to the power generator 20 through the first transfer unit 310 and the first output unit 210.

According to an exemplary embodiment, the input-side gear 311 of the first transfer unit 310 may have a diameter larger than that of the output-side gear 312 of the first transfer unit 310, the input-side gear 311 of the first transfer unit 310 may have a diameter larger than that of the input gear 111, and the output-side gear 312 of the first transfer unit 310 may have a diameter smaller than that of the first output gear 212 of the first output unit 210.

Meanwhile, gear ratios between the input gear 111 of the input unit 110, the input-side gear 311 of the first transfer unit 310, the output-side gear 312 of the first transfer unit 310, and the first output gear 212 of the first output unit 210 may be formed of various reduction gear ratios or acceleration gear ratios.

For example, the gear ratios between the input gear 111 of the input unit 110, the input-side gear 311 of the first transfer unit 310, the output-side gear 312 of the first transfer unit 310, and the first output gear 212 of the first output unit 210 may be formed of a reduction gear ratio of about 1/20. In addition, the gear ratios between the input gear 111 of the input unit 110, the input-side gear 311 of the first transfer unit 310, the output-side gear 312 of the first transfer unit 310, and the first output gear 212 of the first output unit 210 may be formed of a combination of various gear ratios depending on an output of the expander 12.

The second transfer unit 320 may have a shaft 323, an input-side gear 321 provided at one side of the shaft 323, and an output-side gear 322 provided at the other side of the shaft 323.

The shaft 323 of the second transfer unit 320 may be rotatably supported by a bearing 145 in the casing 100.

As illustrated in FIGS. 1 and 3, the input-side gear 321 of the second transfer unit 320 may be engaged with the input gear 111 of the input unit 110, and the output-side gear 322 of the second transfer unit 320 may be engaged with the second output gear 222 of the second output unit 220. Therefore, the torque of the input unit 110 may be transferred to the second transfer unit 320 and the second output unit 220, and the torque of the second output unit 220 may be transferred to the crank shaft 31 of the engine through the pulley 35 of the second output unit 220 or be transferred to the PTO for a vehicle through the second output unit 220.

In addition, the second transfer unit 320 may further include an auxiliary gear 324 engaged with the first output gear 212 of the first output unit 210. The second transfer unit 320 additionally may transfer a torque of the first output gear 212 to the second output unit 210 by the auxiliary gear 324, thereby making it possible to more smoothly transfer auxiliary power.

According to an exemplary embodiment, the input-side gear 321 of the second transfer unit 320 may have a diameter larger than those of the output-side gear 322 and the auxiliary gear 324 of the second transfer unit 320, the input-side gear 321 of the second transfer unit 320 may have a diameter larger than that of the input gear 111, and the output-side gear 322 of the second transfer unit 320 may have a diameter smaller than that of the second output gear 222 of the second output unit 220.

Meanwhile, gear ratios between the input gear 111 of the input unit 110, the input-side gear 321 of the second transfer unit 320, the output-side gear 322 of the second transfer unit 320, and the second output gear 222 of the second output unit 220 may be formed of various reduction gear ratios or acceleration gear ratios.

For example, the gear ratios between the input gear 111 of the input unit 110, the input-side gear 321 of the second transfer unit 320, the output-side gear 322 of the second transfer unit 320, and the second output gear 222 of the second output unit 220 may be formed of a reduction gear ratio of about 1/100. In addition, the gear ratios between the input gear 111 of the input unit 110, the input-side gear 321 of the second transfer unit 320, the output-side gear 322 of the second transfer unit 320, and the second output gear 222 of the second output unit 220 may be formed of a combination of various gear ratios depending on an output of the expander 12.

According to an exemplary embodiment, the power generator 20 may be formed of an alternator disposed adjacently to the engine of the vehicle. Therefore, the casing 100 according to the present disclosure may be installed at a position at which an existing alternator is disposed, thereby making it possible to minimize a change in an existing layout.

In addition, as illustrated in FIG. 2, a battery 25 may be connected to the power generator 20 by a power line 23. Therefore, electric energy generated by the power generator 20 may be charge the battery 25, and/or be stored in the battery 25. In addition, power may be supplied to a circulation pump 14 of the waste heat recovery system 10, a controller 16 of the waste heat recovery system 10, a coolant circulation pump (not illustrated), and the like, through the power line 23 between the power generator 20 and the battery 25.

Figure 4:
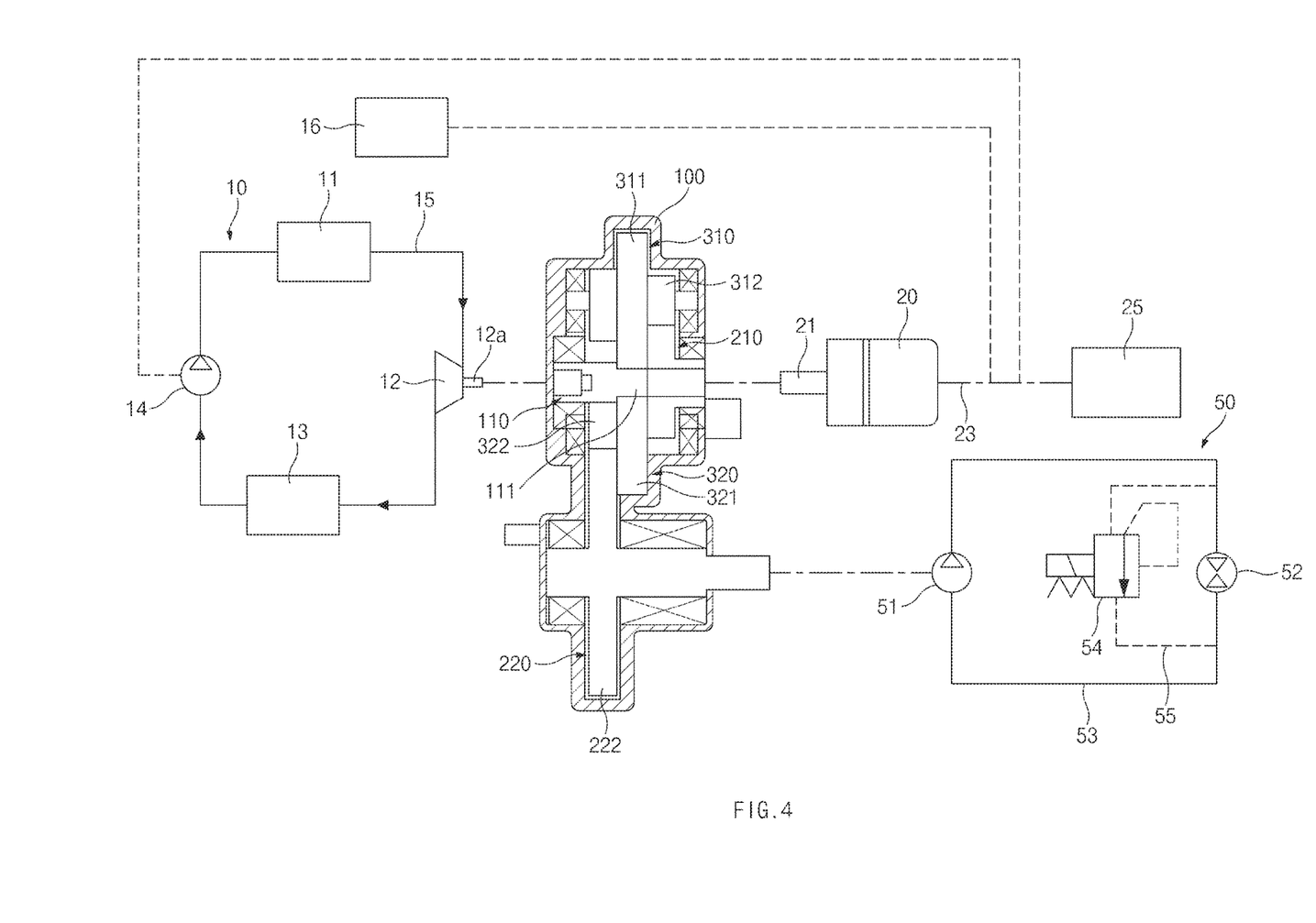
FIG. 4 is a view illustrating a recovered energy transfer apparatus of a waste heat recovery system according to another exemplary embodiment of the present disclosure.

FIG. 4 is a view illustrating a recovered energy transfer apparatus of a waste heat recovery system according to another exemplary embodiment of the present disclosure.

Referring to FIG. 4, the recovered energy transfer apparatus of a waste heat recovery system according to another exemplary embodiment of the present disclosure may include an input unit 110 to which an expander 12 of the waste heat recovery system 10 may be connected, a first output unit 210 connected to a power generator 20, a second output unit 220 connected to a hydraulic circuit 50, a first transfer unit 310 transferring a torque of the input unit 110 to the first output unit 210, and a second transfer unit 320 for transferring the torque of the input unit 110 to the second output unit 220.

The hydraulic circuit 50 may have a hydraulic pump 51 connected to an output shaft 221 of the second output unit 220 and a hydraulic motor 52 connected to an engine of a vehicle or a PTO for a vehicle.

The hydraulic pump 51 and the hydraulic motor 52 may be connected to each other by a hydraulic line 53, a bypass line 55 may be connected to an inlet and an outlet of the hydraulic motor 52, and a pressure relief valve 54 allowing the hydraulic motor 52 to be selectively in a no-load state may be installed on the bypass line 55.

The pressure relief valve 54 may be configured to be switched into any one of an unloading position and a loading position by an actuator. Here, a channel of the pressure relief valve 54 may be opened at the unloading position and is closed at the loading position.

Since the hydraulic motor 52 may be selectively in the no-load state by the pressure relief valve 54 and the bypass line 55, the pressure relief valve 54 and the bypass line 55 may perform a function corresponding to the clutch 38 in another exemplary embodiment.

For example, in a case (a cruise control of the vehicle or a power take-off operation) in which auxiliary power is required in the engine of the vehicle, the PTO, or the like, the pressure relief valve 54 may be switched into the loading position, such that the recovered energy of the expander 12 may be transferred to the engine of the vehicle or the PTO through the second output unit 220, and in a case (braking, stopping, parking, and the like, of the vehicle) in which the auxiliary power may not be transferred to the engine of the vehicle, the PTO, or the like, the pressure relief valve 54 may be switched into the unloading position, such that a transfer of the recovered energy of the expander 12 to the engine of the vehicle or the PTO through the second output unit 220 may be blocked and the entire recovered energy of the expander 12 may be transferred to the power generator 20 through the first output unit 210. Therefore, waste of the recovered energy is reduced, thereby making it possible to significantly improve fuel efficiency of the vehicle.

Figure 5:
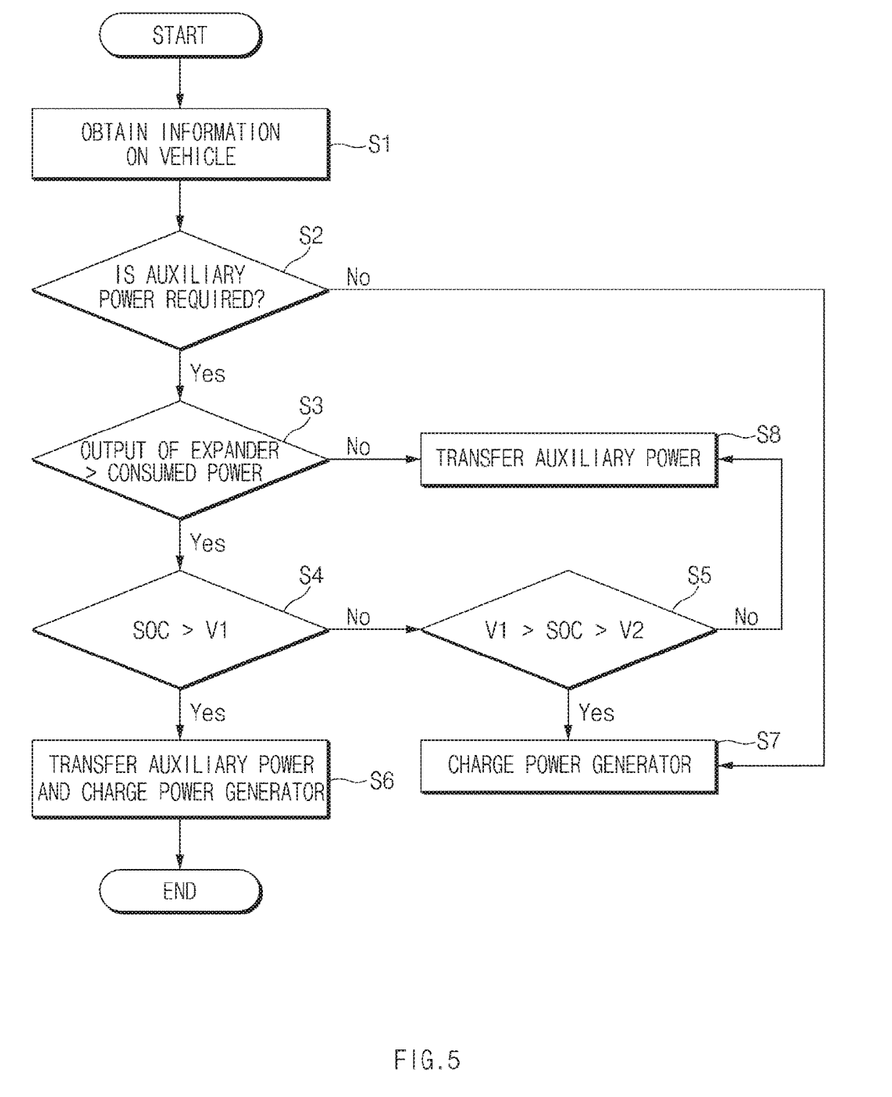
FIG. 5 is a flow chart illustrating a recovered energy transfer method of a waste heat recovery system according to an exemplary embodiment of the present disclosure.

FIG. 5 is a flow chart illustrating a recovered energy transfer method of a waste heat recovery system according to an exemplary embodiment of the present disclosure.

First, various information on a vehicle, such as a revolution per minute (RPM) of an engine, a vehicle speed, an opening rate of an accelerator pedal, whether or not a brake pedal is operated, consumed power of a vehicle, an RPM of an expander, pressures/temperatures of an inlet and an outlet of the expander, a flow rate of a working fluid of the waste heat recovery system, and the like, may be obtained through an electronic control unit (ECU), or the like, of the vehicle (S1).

It may be decided that auxiliary power is required on the basis of the information on the vehicle (S2). A condition in which the auxiliary power is required may be decided by sensing whether or not the vehicle is in a cruise control state, whether or not a power take-off operation is performed from the engine or a transmission of the vehicle, or the like.

When the auxiliary power is not required, that is, when the auxiliary power may not be transferred, the clutch 38 may be disengaged or the pressure relief valve 54 may be switched into the unloading position to transfer the recovered energy of the expander 12 to only the first output unit 210, such that the entire recovered energy of the expander 12 may be used to charge the power generator 20 (S7).

In addition, when the auxiliary power is required, it may be decided whether or not an output (a value obtained by converting the recovered energy into a power value) of the expander 12 is larger than consumed power of the vehicle (S3).

When the output of the expander 12 is smaller than the consumed power of the vehicle, the recovered energy of the expander 12 may be transferred to only the second output unit 220 in a state in which the clutch 38 is engaged or the pressure relief valve 54 is switched into the loading position (that is, a state in which the second output unit 220 is connected), thereby transferring the auxiliary power to the engine of the vehicle or the PTO (S8).

When the output of the expander 12 is larger than the consumed power of the vehicle, it may be decided whether or not a state of charge (SoC) of the battery 25 is larger than a first set value V1 (S4). Here, the first set value V1, which may be a value that may allow the recovered energy of the expander 12 to be used to transfer the auxiliary power and charge the power generator 20, may correspond to, for example, about 80% of an entire state of charge of the battery 25.

When the state of charge (SoC) of the battery 25 is larger than the first set value V1, the recovered energy of the expander 12 may be transferred to both of the first output unit 210 and the second output unit 220, thereby making it possible to transfer the auxiliary power to the engine of the vehicle or the PTO and charge the power generator 20 (S6).

It may be decided whether or not the state of charge (SoC) of the battery 25 is smaller than the first set value V1 and/or is larger than a second set value V2 (S5). Here, the second set value V2, which may be a value that allows the recovered energy of the expander 12 not to be used to transfer the auxiliary power and allows the recovered energy of the expander 12 to be used only to charge the power generator 20, may correspond to, for example, about 20% of an entire state of charge of the battery 25.

When the state of charge (SoC) of the battery 25 is smaller than the first set value V1 and is larger than the second set value V2, the recovered energy of the expander 12 may be transferred to only the first output unit 210, thereby charging the power generator 20 (S7).

In addition, when the state of charge (SoC) of the battery 25 is smaller than the first set value V1 and the second set value V2, the recovered energy of the expander 12 may be transferred to only the second output unit 220, thereby transferring the auxiliary power to the engine of the vehicle or the PTO (S8).

As described above, according to an exemplary embodiment of the present disclosure, the recovered energy may be transferred to the engine of the vehicle or the PTO for a vehicle in a condition in which the auxiliary power is required in the vehicle and the recovered energy obtained through the waste heat recovery system is transferred to the alternator without loss in a condition (braking, stopping, parking, and the like, of the vehicle) in which the auxiliary power may not be transferred to the vehicle to reduce waste of the recovered energy, thereby making it possible to significantly improve fuel efficiency.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A recovered energy transfer apparatus of a waste heat recovery system, comprising:
    an input unit connected to an expander of the waste heat recovery system and rotatable by recovered energy of the expander; and
    one or more output units for receiving a torque of the input unit and outputting the torque to at least one of a power generator, an engine of a vehicle, and a power take-off for a vehicle,
    wherein the input unit includes a shaft, the shaft having a coupling hole formed in one end surface thereof, and an output shaft of the expander is coupled to the coupling hole of the shaft.

2. The recovered energy transfer apparatus of a waste heat recovery system according to claim 1, wherein the input unit has an input gear provided on an outer peripheral surface of the shaft.

3. The recovered energy transfer apparatus of a waste heat recovery system according to claim 1, wherein the output units include a first output unit connected to the power generator and a second output unit connected to the engine of a vehicle or the power take-off for a vehicle.

4. The recovered energy transfer apparatus of a waste heat recovery system according to claim 3, wherein the first output unit has a shaft and a first output gear provided on an outer peripheral surface of the shaft, and
    an output shaft of the power generator is coupled to the shaft.

5. The recovered energy transfer apparatus of a waste heat recovery system according to claim 4, wherein the second output unit has a shaft and a second output gear provided on an outer peripheral surface of the shaft, and
    any one of the engine of a vehicle and the power take-off for a vehicle is connected to the shaft.

6. The recovered energy transfer apparatus of a waste heat recovery system according to claim 5, further comprising one or more transfer units interposed between the input unit and the output units and transferring the torque of the input unit to the output units.

7. The recovered energy transfer apparatus of a waste heat recovery system according to claim 6, wherein the transfer units include a first transfer unit disposed between the input unit and the first output unit and transferring the torque of the input unit to the first output unit and a second transfer unit disposed between the input unit and the second output unit and transferring the torque of the input unit to the second output unit.

8. The recovered energy transfer apparatus of a waste heat recovery system according to claim 7, wherein the first transfer unit has a shaft, an input-side gear provided at one side of the shaft, and an output-side gear provided at the other side of the shaft, and
    the input-side gear is engaged with the input gear of the input unit, and the output-side gear is engaged with the first output gear of the first output unit.

9. The recovered energy transfer apparatus of a waste heat recovery system according to claim 8, wherein the second transfer unit has a shaft, an input-side gear provided at one side of the shaft, and an output-side gear provided at the other side of the shaft.

10. The recovered energy transfer apparatus of a waste heat recovery system according to claim 9, wherein the input-side gear of the second transfer unit is engaged with the input gear of the input unit, and the output-side gear of the second transfer unit is engaged with the second output gear of the second output unit.

11. The recovered energy transfer apparatus of a waste heat recovery system according to claim 10, wherein a clutch is installed at the shaft of the second output unit, the clutch connecting or blocking a transfer of the torque of the input unit through the second output unit.

12. The recovered energy transfer apparatus of a waste heat recovery system according to claim 11, wherein a pulley is installed at the shaft of the second output unit, the pulley being connected to a crank shaft of the engine through a belt.

13. The recovered energy transfer apparatus of a waste heat recovery system according to claim 11, wherein a shaft of the power take-off for a vehicle is connected to the shaft of the second output unit.

14. A recovered energy transfer apparatus of a waste heat recovery system, comprising:

an input unit connected to an expander of the waste heat recovery system and rotatable by recovered energy of the expander;

a first output unit connected to a power generator;

a second output unit connected to a hydraulic circuit;

a first transfer unit for transferring a torque of the input unit to the first output unit; and a second transfer unit for transferring the torque of the input unit to the second output unit, wherein the hydraulic circuit includes a hydraulic pump connected to the second output unit and a hydraulic motor connected to an engine of a vehicle or a power take-off for a vehicle, wherein the input unit includes a shaft, the shaft having a coupling hole formed in one end surface thereof, and an output shaft of the expander is coupled to the coupling hole of the shaft.

15. The recovered energy transfer apparatus of a waste heat recovery system according to claim 14, wherein a pressure relief valve allowing the hydraulic motor to be selectively in a no-load state is installed on a bypass line.

16. A recovered energy transfer method of a waste heat recovery system using a recovered energy transfer apparatus of a waste heat recovery system including an input unit connected to an expander of the waste heat recovery system and rotated by recovered energy of the expander, a first output unit connected to a power generator, a second output unit connected to an engine of a vehicle or a power take-off for a vehicle, a first transfer unit for transferring a torque of the input unit to the first output unit, and a second transfer unit for transferring the torque of the input unit to the second output unit, comprising:

obtaining information on the vehicle;

deciding whether or not an output of the expander is larger than consumed power of the vehicle when it is decided that the auxiliary power is required on the basis of the information on the vehicle;

deciding whether or not a state of charge of a battery is larger than a first set value when the output of the expander is larger than the consumed power of the vehicle; and transferring the recovered energy of the expander to both of the first output unit and the second output unit when the state of charge of the battery is larger than the first set value.

17. The recovered energy transfer method of a waste heat recovery system according to claim 16, further comprising:

deciding whether or not an output of the expander is larger than consumed power of the vehicle when it is decided that the auxiliary power is required;

deciding whether or not a state of charge of a battery is larger than a first set value when the output of the expander is larger than the consumed power of the vehicle; and transferring the recovered energy of the expander to only the first output unit when the state of charge of the battery is smaller than the first set value and is larger than a second set value.

18. The recovered energy transfer method of a waste heat recovery system according to claim 16, further comprising:

deciding whether or not an output of the expander is larger than consumed power of the vehicle when it is decided that the auxiliary power is required;

deciding whether or not a state of charge of a battery is larger than a first set value when the output of the expander is larger than the consumed power of the vehicle; and transferring the recovered energy of the expander to only the second output unit when the state of charge of the battery is smaller than the first set value and a second set value.

19. The recovered energy transfer method of a waste heat recovery system according to claim 16, further comprising:

deciding whether or not an output of the expander is larger than consumed power of the vehicle when it is decided that the auxiliary power is required; and transferring the recovered energy of the expander to only the second output unit when the output of the expander is smaller than the consumed power of the vehicle.

20. The recovered energy transfer method of a waste heat recovery system according to claim 16, further comprising transferring the recovered energy of the expander to only the first output unit when it is decided that the auxiliary power is not required.

* * * * *